United States Patent

Smith, Jr.

[15] 3,694,636

[45] Sept. 26, 1972

[54] DIGITAL COMPUTER PROCESS CONTROL WITH OPERATIONAL LEARNING PROCEDURE

[72] Inventor: Andrew W. Smith, Jr., Mt. Lebanon, Pa.

[73] Assignee: Westinghouse Electric Corporation, Pittsburgh, Pa.

[22] Filed: March 20, 1970

[21] Appl. No.: 21,313

[52] U.S. Cl. ..........................235/151.1, 72/8, 72/11, 72/16, 444/1

[51] Int. Cl. ..........................B21b 37/12, G06f 15/46

[58] Field of Search...........235/150.1, 151.11, 151.1; 72/7

[56] References Cited

UNITED STATES PATENTS 3,332,263 7/1967 Beadle et al.....................72/7

*Primary Examiner*—Malcolm A. Morrison
*Assistant Examiner*—R. Stephen Dildine, Jr.
*Attorney*—F. H. Henson and R. G. Brodahl

[57] ABSTRACT

A programmed digital computer process control is disclosed including an operational learning procedure in relation to the operation of a dynamic process such as at least one rolling mill stand and classification by operational categories, such as by workpiece grade categories and workpiece thickness categories, with particular usefulness for a reversing mill having a variable number of workpiece passes. A least squares regression fitting of collected data is performed on line relative to process information data collected for establishing the constants in a predetermined process operational mathematical expression, which constants are modified and stored in relation to the above predetermined categories of past process operation for the prediction of future process operation. As a result of the here provided learning procedure the past operational standard error deviation is determined and can be used to test new data to determine that it does not exceed the normal and permissive scatter for some particular grade and workpiece thickness classification.

15 Claims, 8 Drawing Figures

WITNESSES:
Bernard R. Gregoire
Helen M. Farkas

INVENTOR
Andrew W. Smith, Jr.
BY [signature]
ATTORNEY

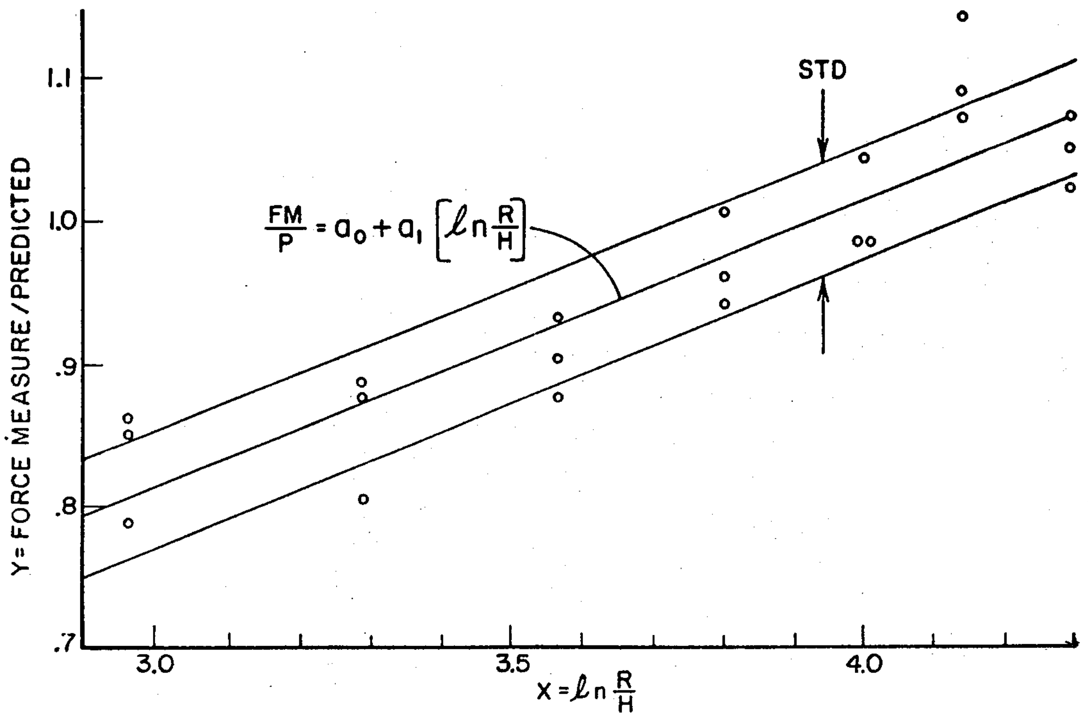

FIG. 4

| HEIGHT CLASS | GRADE CLASS 1 | GRADE CLASS 2 | GRADE CLASS 3 | GRADE CLASS 4 | GRADE CLASS 5 |
|---|---|---|---|---|---|
| 1 | $a_0$ =.30<br>$a_1$ =.05<br>STD=.03 | $a_0$ = 1<br>$a_1$ = 0<br>STD = 0 | $a_0$ = 1<br>$a_1$ = 0<br>STD = 0 | $a_0$ = 1<br>$a_1$ = 0<br>STD = 0 | $a_0$ = 1<br>$a_1$ = 0<br>STD = 0 |
| 2 | $a_0$ =.25<br>$a_1$ =.15<br>STD=.03 | $a_0$ = 1<br>$a_1$ = 0<br>STD = 0 | $a_0$ = 1<br>$a_1$ = 0<br>STD = 0 | $a_0$ = 1<br>$a_1$ = 0<br>STD = 0 | $a_0$ = 1<br>$a_1$ = 0<br>STD = 0 |
| 3 | $a_0$ = 1<br>$a_1$ = 0<br>STD= 0 | $a_0$ = 1<br>$a_1$ = 0<br>STD = 0 | $a_0$ = 1<br>$a_1$ = 0<br>STD = 0 | $a_0$ = 1<br>$a_1$ = 0<br>STD = 0 | $a_0$ = 1<br>$a_1$ = 0<br>STD = 0 |
| 4 | $a_0$ = 1<br>$a_1$ = 0<br>STD= 0 | $a_0$ = 1<br>$a_1$ = 0<br>STD = 0 | $a_0$ = 1<br>$a_1$ = 0<br>STD = 0 | $a_0$ = 1<br>$a_1$ = 0<br>STD = 0 | $a_0$ = 1<br>$a_1$ = 0<br>STD = 0 |
| 5 | $a_0$ =.21<br>$a_1$ =.20<br>STD=.04 | $a_0$ = 1<br>$a_1$ = 0<br>STD = 0 | $a_0$ = 1<br>$a_1$ = 0<br>STD = 0 | $a_0$ = 1<br>$a_1$ = 0<br>STD = 0 | $a_0$ = 1<br>$a_1$ = 0<br>STD = 0 |

FIG. 7

DIGITAL COMPUTER PROCESS CONTROL WITH OPERATIONAL LEARNING PROCEDURE

BACKGROUND OF THE INVENTION

The use of programmed digital computers for process control applications is well accepted at the present time, particularly for the control of metal strip rolling mills. Substantially all of the hot strip steel mills installed in the United States in the last several years are presently operative with on line digital computer control systems, and several previously existing hot strip steel mills have been revamped for operation with such a digital computer control system. The extent of control system automation for each particular rolling mill varies substantially, but in general some form of digital computer control system has been considered and usually purchased for this application.

Most such control systems have the ability to control operational settings or adjustments which determine the delivery thickness or height and the width of the workpiece product being rolled. This has been done most effectively by the use of predetermined process operation related model equations, and the necessary control system logic to determine the desired settings of the respective rolling mill stand passes in a way that is flexible enough to accommodate the required wide variety of workpiece products. One of the more important considerations of such an installation is the ability to establish control settings that give acceptable workpiece production quality at the time of process operation start-up, and to adjust and update the settings throughout the life of the installation as operational conditions change and requirements are modified.

On the earlier applications of programmed digital computers for the control of rolling mill stands, this updating was done by collecting data which was then used in performing off-line analysis of the operation. Of necessity the amount of data which could be used in this way was limited, both by the time and effort required to collect and prepare the data for analysis and by the amount of off-line computer time available for performing the operational analysis. It should be understood that a great deal of data can be collected within a short time in the operation of a typical hot strip mill. Where five passes are performed for a typical workpiece reduction in a given roughing mill stand, and seven passes of the same workpiece in the tandem finishing mill, at the rate of one workpiece coil a minute over 5000 sets of data concerning scanned roll force, stand horsepower and stand reduction can be collected during each eight hour shift. It is therefore very difficult to select representative data for the desired off-line analysis.

In the operation of particularly a metal rolling mill having at least one stand, the unloaded roll opening and the speed for each mill stand as well as other variables can be predictably set up in advance by a process control digital computer operative with predetermined process relationships, such as model equations, to provide a desired workpiece reduction resulting in a desired thickness delivery workpiece from each pass or stand operation of the rolling mill. It may be assumed that the loaded roll opening at a given stand equals the stand workpiece delivery thickness, since there is substantially no elastic workpiece recovery. The predictive setup assumptions may be in error, and certain other mill operating parameters affect the stand loaded roll operation after setup conditions have been established, such that an attendant stand thickness control system is employed to closely control the stand delivery work product. Recent experience with rolling mills, such as reversing single stand mills or a multiple stand tandem hot strip mill, has demonstrated that a roll force thickness control system is particularly effective for this purpose. Such a roll force thickness control system employs Hooke's Law in the form of the well known equation $H = SD+F/M$ in establishing the unloaded screwdown position $Sd$ at a given rolling stand. The loaded roll opening is substantially the delivery workpiece height $H$, and under normal rolling conditions equals the unloaded roll opening or scheduled screwdown position SD plus the determined offset OS and the mill spring stretch $F/M$ which is obtained by dividing the measured stand roll separating force F by the predetermined mill spring constant $M$ for that stand. To embody this rolling principle in a roll force thickness control system, a load cell or other stand roll force detector measures the actual roll separating force F for the stand. The unloaded screwdown position $SD$ is then controlled to minimize the roll force changes from a reference or setpoint value, to thereby hold the loaded roll opening at a substantially constant and desired value. Once the unloaded roll opening $SD$ for each stand, and additionally the stand speed setup are determined by the process control digital computer for a particular pass through a workpiece stand, the workpiece rolling operation may be started. The respective stand screwdowns are then continuously controlled to regulate the workpiece delivery thickness or height H from each pass through a mill stand.

In general a roll force workpiece thickness control operation is well known, and a description of same can be found in U.S. Pat. No. 2,726,541 of R. B. Sims. In addition reference is made for this purpose to a published article entitled Automatic Gauge Control For Modern Hot Strip Mills which appeared in the Dec. 1967 Iron and Steel Engineer at pages 75 to 86.

It is commercially desirable to provide predictive mill stand setup values, which in addition to providing a better desired rolling of particularly the head end of the workpiece strip, also establishes mill operating conditions which are compatible with the subsequent takeover relative to the remainder of the workpiece strip by the more conventional automatic roll force thickness control system.

Before the use of digital computers for this purpose, mill operational setup parameters were in a less sophisticated and more general way set by a human operator. However, as the stand operation and measured rolling mill stand variables have increased both in number and complexity, a programmed process control digital computer has become desirable to take over the dominant role in determining mill stand setup, with the human operator serving as a backup to the control computer. The process control computer has operated to establish certain predictive mill settings according to a predetermined process operation oriented relationship, such as a mathematical model equation, and as each workpiece strip or coil is rolled data information is gathered from the various mill operation sensors to improve the predictive setup relative to the rolling of the next similar workpiece. Such a control system has proved satisfactory in that the original predictive setup value as based upon the one or more process oriented relationships, such as model equations, can be adapted to a better mill setup by off-line data manipulation determined from the previous rolling of workpieces.

For rolling mills operated under control of a process control digital computer in an effort to provide substantially desired thickness delivery strip products from each pass or stand during the rolling of individual workpieces, a feed forward force control system has been provided whereby for as long as a predetermined condition such as the workpiece grade category is the same, the actual measured roll force for each of the respective passes or stands of the rolling mill is utilized to determine whether the general roll force level established by the predetermined process relationships, such as the model equations, should be higher or lower as compared to the previous rolling of at least one similar grade workpiece.

It is at the present time generally well known in this art that a process control digital computer, including an information storage memory which contains a stepped sequencial instruction program, can be utilized for controlling the rolling mill operation and in addition receives input data information regarding the known characteristics of each workpiece strip that is rolled and then monitors the respective stand operational results for the rolling of each category of workpiece for improving the stored information based upon previous rolling of similar workpieces that is already within its memory. Typical of the input data information which is known in advance and enters into the operation of such a control system would be (1) the desired workpiece delivery thickness and temperature from the last stand, (2) the entry temperature to a given rolling mill stand can be estimated or determined by an entry pyrometer, (3) the entry thickness to each of the mill stands, or for each pass through a given mill stand, is known since this is the delivery thickness from the last previous mill stand pass, (5) the entry width of the workpiece to the mill stands is supplied as input information or can be measured by a suitable width gauge.

It is generally known to persons skilled in this particular art that a programmed process control digital computer can include a central integrated process control or setup processor with associated input and output equipment, such as described in a published article entitled Understanding Digital Computer Process Control which appeared in Automation Magazine for Jan. 1965 at pages 71 to 76. A background description of a process control digital computer application for a dynamic operation such as the control of a rolling mill can be found in a published article entitled Programming for Process Control which appeared in the Jan. 1965 Westinghouse Engineer at pages 13 to 19, and in another published article entitled Computer Program Organization For An Automatically Controlled Rolling Mill which appeared in the 1966 Iron and Steel Engineer Yearbook at pages 328 to 334. An additional published article of interest here is entitled On-Line Computer Controls Giant Rolling Mill which appeared in the Nov. 1965 Westinghouse Engineer at pages 182 through 187.

It is well known and understood by persons skilled in this particular art of applying digital computer process control systems that a combined hardware and software process control system, or an extended purpose process control digital computer apparatus which is produced when a general purpose digital computer is operated under the control of a predetermined software instruction program such as illustrated by the functional program flow chart shown in the attached drawings, can also be built using hardware or wired logic programming in view of the recognized general functional equivalence of a software programming embodiment as compared to a hardware programming embodiment of substantially the same control system. However, when an involved industrial application such as here described becomes somewhat complex, the economics tend to favor the software approach due to the otherwise greater expense and reduced flexibility which results when logic circuits such as the well known NOR logic circuits are wired together to provide the functional hardware programming circuit arrangement buildup to perform the desired sequential logic program steps.

For the particular operation of a multiple stand tandem rolling mill, after the head end of the workpiece strip is threaded through all of the stands, the use of a conventional roll force thickness control system for providing a substantially constant and desired workpiece delivery thickness from each pass or stand for the remaining length of the workstrip is already well known to persons skilled in this particular art. A published article describing such a system can be found in the 1964 Iron and Steel Engineer Yearbook at pages 753 to 762 and is entitled Fundamentals of Strip Mill Automatic Gauge Control Systems. Another published article of interest appeared in the Mar. 1964 Westinghouse Engineer at pages 34 to 40 and was entitled Strip Mill Automatic Gauge Control Systems.

The use of an on-line digital computer control system requires one or more process operation model equations or the like relating to the controlled process be stored in the memory unit of the digital computer to enable predictive control of the process and subsequently adaptive control of the process relative to updating information obtained from monitored actual operation of the process. For the example of a rolling mill to permit a prediction of each stand or pass roll force relative to a given workpiece having a known grade characteristic, a suitable model equation is used to predict the roll force for each such pass or stand, and in relation to the desired reduction to be made in said pass or stand, the unloaded roll opening is predicted. Such predictive control operation is described in several publications; for example in the 1962 Iron and Steel Engineering Yearbook at pages 587 to 592 is an article entitled ON-Line Computer Control for a Reversing Plate Mill. Another descriptive published article of interest here and dealing with this subject matter can be found in the Iron and Steel Engineering Yearbook for 1965 at pages 461 to 467 and is entitled Determination of a Mathematical Model for Rolling Mill Control. An additional published article pertinent to this subject can be found in the Iron and Steel Engineering Yearbook for 1965 at pages 468 to 475 and is entitled Combination Slab and Plate Mill Rolls Under Computer Control. A further published article of interest here to illustrate the rolling mill computer control environment in which the teachings of the present invention can be utilized can be found in the Westinghouse Engineer for Jan. 1969 at pages 2 through 8, and is entitled Integrated Process Control Rolls Steel More Efficiently. An additional published article of interest here appeared in the Iron and Steel Engineer Yearbook for 1963 at pages 726 to 733 and was entitled Installation and Operating Experience With Computer and Programmed Mill Controls.

CROSS REFERENCE TO RELATED APPLICATIONS

The present invention is related to the inventions disclosed in copending Pat. applications Ser. No. 852,627, filed Aug. 25, 1969 now U.S. Pat. No. 3629212, and Ser. No. 828,265, filed May 27, 1969 now U.S. Pat. No. 3610005, and assigned to the same Assignee as the present application.

In the former copending patent application, an online learning technique was disclosed for a tandem stand finishing mill to provide continuing adjustments in the respective mill stand setups. This learning technique was designed to maintain good sensor calibration and to classify the respective workpiece products so that desired information learned from previous rolling would be applied on the appropriate and corresponding workpiece products at a later time. Selective limiting was used to prevent learning on information data which was enough different from past practice to be unrepresentative and therefore not desired. The response to new data information was varied from a very fast rate on workpiece products being encountered for the first time to a more slow rate for successive improvements of later rolling of similar workpiece products that had been previously rolled.

The rolls of a given mill stand typically are removed from the mill once or twice during each turn for regrinding, and other replacement rolls are installed in the mill stand. This requires a calibration of the rolling mill stand in accordance with the description in the latter copending patent application. The control computer determines for each stand the screwdown positioning system calibration and maintains accurate roll separating force measurements. Since the mill spring modulus M can be established as is already known in this art by driving the screwdown system together as the rolls are turning without workpiece product in the mill stand, the screwdown calibration procedure involves a check of at least two points along the mill spring line to make sure that the earlier determined mill modulus is still applicable at the present time. This involves driving the rolls together and until a predetermined force, such as 2,000,000 lbs., is established. The actual stand roll force is then determined and an accurate value established. Variations in the roll force are present as the rolls turns since they are not perfectly round and have some eccentricity; if this eccentricity is too large for good control of workpiece delivery thickness such a condition is detected and alarmed. The rolls are then moved an additional distance together such as 0.050 inch and the resulting roll force measurement is repeated. A determination of the change in force experienced for this fixed change in screwdown setting will establish whether the apparent mill modulus M agrees with the predetermined value for the mill modulus. Within limits, suitable adjustments can be made in the roll separating force measurement as a result of such a comparison of the apparent mill modulus, and the predetermined mill modulus errors which appear to be too large are alarmed and a request can be made to the human operator and maintenance personnel of the rolling mill to check the roll force transducers and related control devices. This calibration procedure makes certain that the roll force and screwdown measurements used in the adaptive control system are well calibrated and repeatable. The screwdown positioning system on each of the rolling mill stands can be calibrated as often as desired in relation to successive and different workpiece products which are being rolled. The delivery workpiece thickness or height H from the last stand can be measured by an X-ray thickness gauge, and the latter workpiece thickness reading along with the sensed operating speeds of the other stands can be used to determine the workpiece thickness delivered from each of the stands through the well known mass flow technique by which the product of the workpiece delivery thickness and operating speed for each stand is equal to the same product for the respective other stands. The X-ray determined delivery thickness of the last stand and the mass flow determined delivery thickness for each of the other stands is then compared for each other stand with the workpiece delivery thickness determined from measured roll force and the well known relationship with the screwdown position and mill modulus for that stand in accordance with the illustration shown in FIG. 3, and any difference is used as an offset quantity to adjust the unloaded screwdown calibration SD for the respective stand.

SUMMARY OF PRESENT INVENTION

In accordance with the general principles of the present invention at least one rolling mill stand is under the control of the process control digital computer for providing a desired delivery workpiece strip thickness or height from that stand in relation to stored and updated information learned from and classified according to the previous rolling of similar workpieces. A stand operation control system is provided which takes advantage of stored rolling experience information gained from the previous rolling of similar workpieces. Measurements are made during the rolling of each workpiece to determine whether the general operation levels should be higher or lower relative to predicted stand operation values, and from this determination for subsequent and similar workpieces operational correction factors are determined and stored to compensate when needed for each rolling mill stand operation. The target workpiece thickness to be delivered from each stand for subsequent and similar workpieces is maintained in this manner better than can be determined from the original schedule calculation using the stored process model equations or like predetermined process operation relationships. The present invention provides a new and improved workpiece thickness control system for establishing updated expressions to be used in a predetermined mathematical relationship between selected process operational characteristics, in regard to previous rolling of similar workpieces. These expressions are stored in workpiece oriented classified locations in the digital computer memory to improve the rolling of subsequent similar workpieces.

The above features of the present invention will become more apparent from the following detailed description taken in conjunction with the accompanying drawings which form a part of this specification.

BRIEF DESCRIPTION OF THE DRAWINGS

FIG. 4 illustrates the learning procedure of the present invention to establish the updated expressions to be used in a predetermined mathematical relationship in accordance with the present invention for a typical reversing mill stand relative to learning from the actual rolling experience for a plurality of previous and similar workpieces, and with a number of passes through the mill stand to determine the standard error deviation for that workpiece rolling operation in accordance with the present invention;

FIG. 7 illustrates the classified storage of the updated expressions for the mathematical relationship determined in accordance with the learning procedure of the present invention; nd

DESCRIPTION OF A PREFERRED EMBODIMENT

Figure 1:
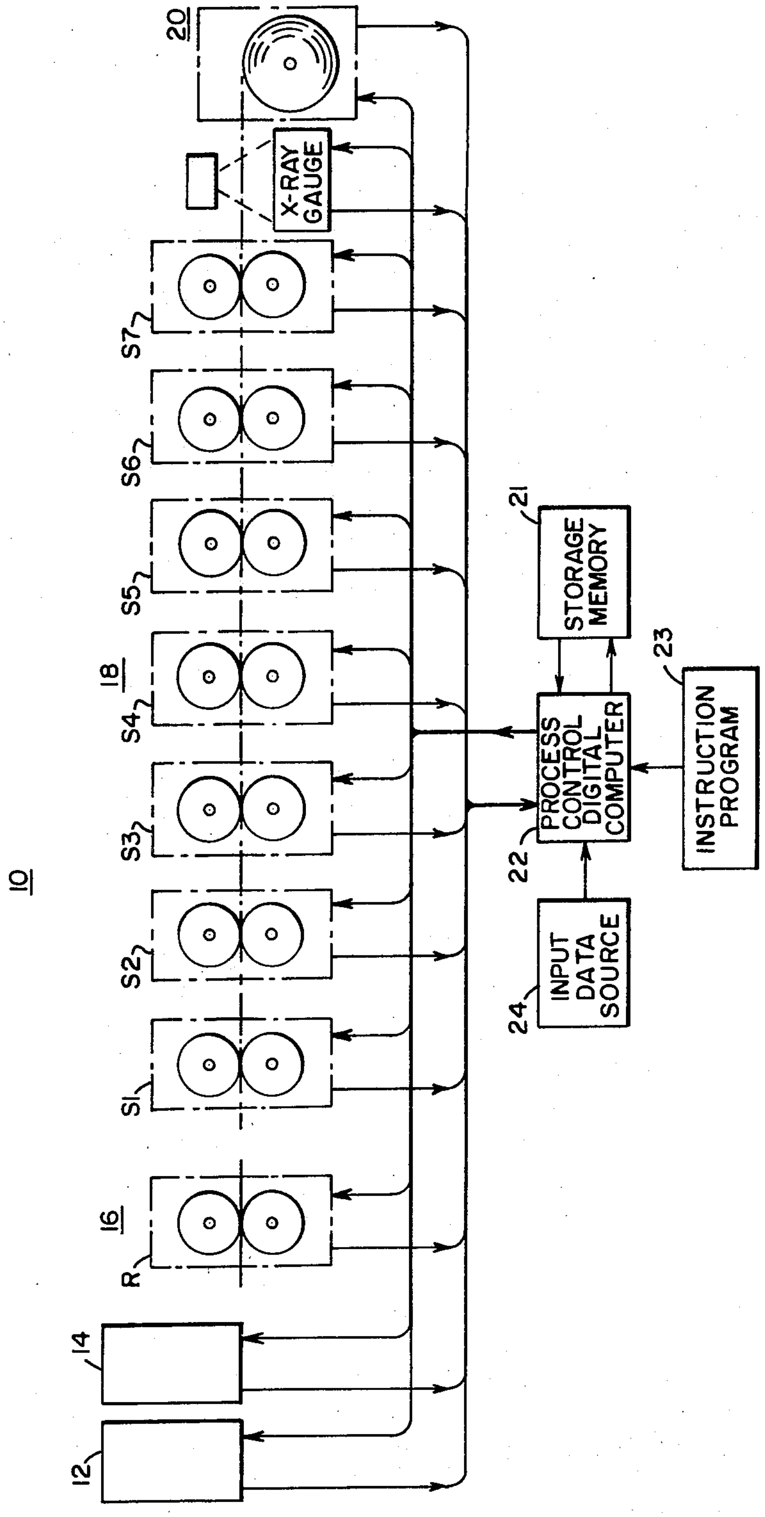
FIG. 1 is a schematic showing of a workpiece rolling mill, including a reversing single stand roughing mill and a generalized showing of the subsequent tandem stand finishing mill suitable for operation with the process control of the present invention.

In FIG. 1 there is shown a semi-continuous hot strip mill 10. Two furnaces 12 and 14 are shown for heating each workpiece slab to rolling temperature, followed by a reversing single stand roughing mill 16 where each slab, which initially are 5 to 10 inches thick can be reduced in three to nine successive passes to a workpiece bar measuring between 1 to 1½ inches in thickness. It is more common for hot strip mills to have a multi-stand roughing mill, but the reversing single stand roughing mil 16 is shown here to better illustrate one embodiment of the learning procedure of the present invention. The tandem finishing mill 18 includes seven stands, and can have tension controlling looper rolls between those stands, followed by a down coiler 20 where the finished workpiece product ranging from 0.050 inch to 0.500 inch thickness is coiled. A typical modern hot strip mill would produce workpiece products between 20 and 80 inches wide. The input data information supplied to the process control digital computer 22 operative with the rolling mill would include such data as workpiece slab dimensions, the workpiece grade or alloy, and the desired delivery thickness from each pass or stand of the rolling mill. This input data information is supplied from an input data source 24. The control computer 22 determines the number of passes to be taken in the roughing mill stand 16 as well as the thickness of the workpiece product to be delivered from each stand in the finishing mill 18 and the speed with which the workpiece product is moved through each of the stands in the finishing mill 18. The process control digital computer 22 is operative with a suitable storage memory 21 and a source of instruction programs 23.

Figure 2:
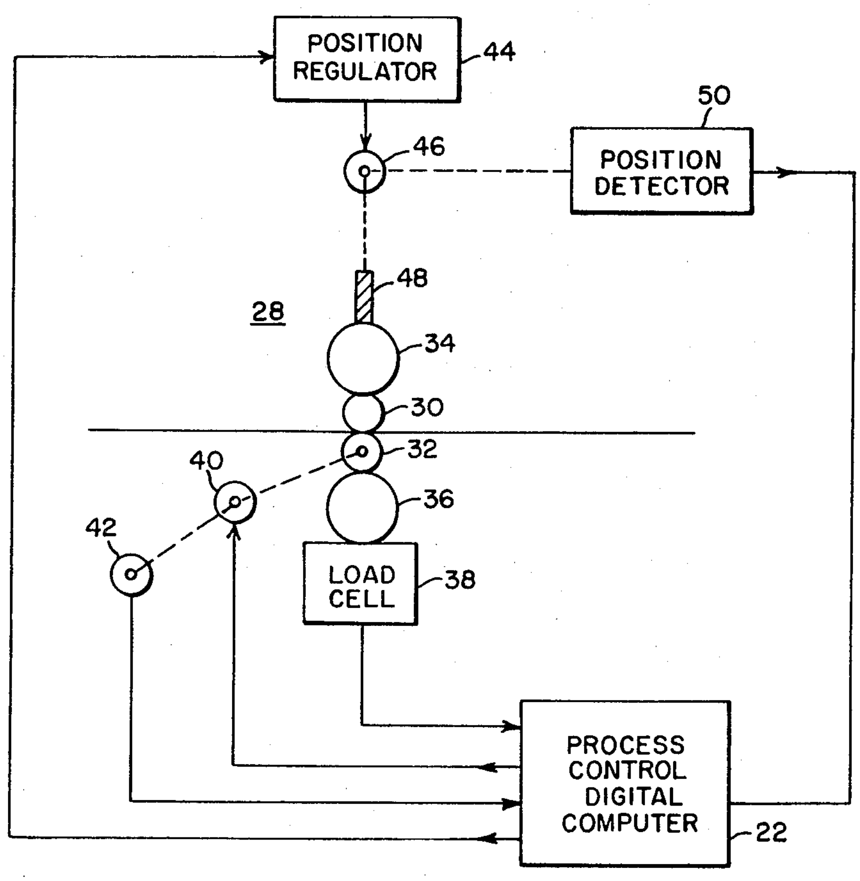
FIG. 2 is a schematic showing of one typical rolling mill stand to illustrate the input data signals and the output control signals relative to the operation of the process control digital computer.

In FIG. 2 there is illustrated a typical rolling mill stand including work rolls 30 and 32 and backup rolls 34 and 36. A load cell 38 is operative to sense the roll separation force of the mill stand 28 and supplies a corresponding electrical signal to the process control digital computer 22 in this regard. A drive motor 40 is connected to drive the work rolls of the stand 28 in accordance with a suitable speed control signal provided by the process control digital computer 22. A speed sensing device 42, such as a tachometer, is coupled to the shaft of the drive motor 40 for providing a feedback signal to the process control digital computer 22 in accordance with the actual speed of this mill stand 28. A position regulator 44 receives a reference unloaded screwdown setting from the process control digital computer 22 for controlling the operation of the screwdown motor 46 operative with a screw mechanism 48 for determining the roll spacing between the work rolls 30 and 32 of the mill stand 28. A position detector 50 is operative with the screwdown motor 46 for providing a feedback signal to the process control digital computer 22 in accordance with the actual unloaded screwdown setting of the mill stand 28.

Figure 3:
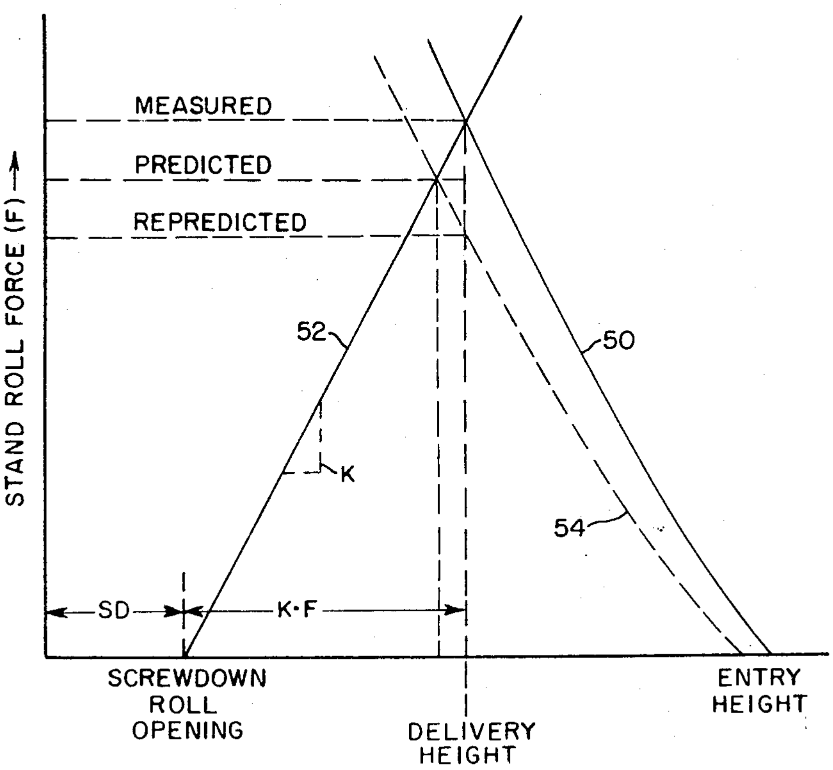
FIG. 3 shows the operational relationship of the mill stand spring-stretch curve and the metal plastic deformation curve for a typical rolling mill stand.

In FIG. 3 there is illustrated the well known operational relationship between the mill stand spring stretch curve 52 and the metal plastic deformation curve 50 utilized for determining the proper unloaded stand roll opening SD to produce the desired delivery workpiece thickness or height $H$ from each pass of a workpiece through a given rolling mill stand. The curve 50 represents the plastic deformation characteristic of the workpiece product being rolled, and shows that the stand roll force increases as the workpiece reduction becomes greater and the workpiece delivery height H decreases. The curve 52 shows the stand mill spring characteristic, with the unloaded screwdown roll opening SD representing unloaded stand roll separation and the mill load deformation being a function of the actual roll separating force F and the previously established mill spring modulus M, with the slope *K* of this curve representing 1/M. The intersection of the two curves 50 and 52 is the point at which the force exerted by the mill stand is equal to the force required to deform the work product, and determines the workpiece delivery height H to be produced on a given pass of the workpiece through that stand. Once the control computer choses the desired workpiece height in and the desired workpiece delivery height of a given pass (N), the control computer then predicts the roll separating force F(N) for that pass and the unloaded screwdown opening SD(N) to effect the desired delivery height H(N) for that pass. This is done utilizing suitable process model equations, such as those set forth in above refenced copending patent application Ser. No. 852,627, filed Aug. 25, 1969. The dotted curve 54 shows this predicted stand operation characteristic. After the workpiece product enters the rolling stand, the actual roll force FM is measured by means of a suitable load cell, and the actual workpiece delivery height HM is determined either by an X-ray thickness gauge or other suitable thickness measurement device or by the roll force relationship calculations as already well known in this art using the mill spring equation $H=SD+[F][K]$. The proper calibration of the screwdown system, the repeatability of the mill spring characteristic K and the predictability of stand roll force *F* required to make a certain reduction on the particular workpiece product in a given pass all affect the precision of the desired mill setup. The mill characteristics for each stand are maintained by the startup calibration procedure as set forth in the above referenced copending patent application Ser. No. 828,265, filed May 27, 1969 and by a similar periodic on-line calibration technique which uses data collected as the workpiece rolling proceeds.

As shown in FIG. 3 for a typical stand operation the original predicted stand roll force $F(N)$ for the present pass $N$ may be lower than the actual measured roll force $FM$ for pass $N$, and if the desired roll force is repredicted using the model equations for the actual draft taken the repredicted roll force $F(N)$ for the present pass is even lower. A comparison of the measured roll force FM and the repredicted force $F(N)$ provides a true measure of the amount of correction the process model equation requires to correlate the predicted roll force $F(N)$ for pass $N$ with the actual measured roll force value FM. The ratio $FM/F(N)$ of the repredicted force divided into the measured force is the correction factor value used in the learning procedure of the present invention for this purpose. It is a per unit number which normally varies between 0.8 and 1.2 if the model equation force predictions $F(N)$ are within 20 percent of the actual force measments for pass ($N$).

When more than one workpiece coil of the same hardness category and thickness category is passed through a given stand, the data collected on each such classification of workpiece coil is used to improve the mill settings for determining the rolling of subsequent of similar classification workpiece coils by that same stand. When either one of the hardness category and thickness category changes, the information already collected on the preceding rolling of the previous classification of workpiece is used to improve values stored away in a learning table for the latter classification of workpiece and relative to previous rolling of similar workpieces. The appropriate information for the new classification of workpiece is chosen from the learning tables to determine the rolling of the new workpiece.

The operational model equation learning procedure in accordance with the teachings of the present invention can be made more simple and more reliable as well as more flexible by classifying the workpiece product being rolled in accordance with a workpiece grade or alloy category and in accordance with a workpiece height or thickness category so that the learned process operational experience information is applied for better predicting the desired process operation relative to a narrow range of similar work product. Typically, such a classification can include five or more product hardness or grade categories and be in relation to five or more stand delivery height or thickness categories for the calssification of the work products being rolled.

The incoming workpiece slabs leaving one of the furnaces 12 and 14 and about to enter the roughing mill 16 as shown in FIG. 1 vary over a range of about 2 to 1 in thickness, since these workpieces have a range of 5 inches to 10 inches. This incoming slab thickness is divided into about 5 slab thickness categories for learning relative to the operation of the roughing mill stand 16. The finished coil dimensions leaving the last stand of the finishing mill 18 vary in thickness over a 10 to 1 range, and this finishing mill delivery thickness can be divided into five or more thickness categories. The process operational information actually collected as various work products are rolled is stored in the storage memory 21 of the process control digital computer 22 in accordance with a particular hardness grade and thickness classification, so that the information will be available to use for that same grade and thickness classification of work product during later rolling of similar work products.

For the purposes of determining the response rate of the operation of the process control digital computer 22 of the present invention to newly gathered information data, a system of weighting is provided to control the rate at which the mill stand operational correction factors or adjustments are changed as a result of measurements made on any particular workpiece coil. When a number of workpiece coils of a given grade and thickness classification are rolled, the information gained from the first coil should have a substantial influence relative to the setup of the mill stands for the rolling of the second similar workpiece coil. However, after a number of similar workpiece coils of the same grade and thickness classification have been rolled, any additional information gained on any one similar workpiece coil of the same grade and thickness classification should not as greatly influence the predictive setup of a given mill stand relative to the next similar workpiece coil. This logic closely follows that used by a capable human operator. The variation of previous MEAN information in response to the NEW actual operation measurements is controlled by a weighting factor WF as illustrated in the following equation:

$$\text{MEAN}=\frac{[\text{MEAN}]\ [WF]+\text{NEW}}{WF+1}$$

On the first workpiece coil of a given group of similar workpieces the weighting factor WF can be set to zero, and the mean value MEAN used to determine the setup for the second and similar workpiece coil will be equal to the new value and the old MEAN would be discarded. After the rolling of several similar workpiece coils, the weighting factor WF is caused to increase to a value such as five, causing the MEAN to become 5/6 of the old MEAN information plus 1/6 of the NEW value information. The larger the weighting factor WF, the slower the response of the control operation to NEW informational data. The same technique is used for the long term learning procedure, where the weighting factor WF is allowed to increase to a larger number such as 30, so that the learning table for long term information is representative of the rolling of many workpiece coils of a similar grade and thickness classification.

In FIG. 4 there is illustrated the operation of a rolling mill stand relative to the learning procedure of the present invention to derive a desired learning procedure from the actual rolling experience for three similar workpieces, each with 7 passes through the mill stand. A standard deviation error STD and a correlated mathematical relationship is provided, which for the illustration of FIG. 4 of a first order linear polynomial to represent the information to be learned in relation to measured roll separating force $FM$ divided by predicted roll separating force P. This illustrates the learning technique utilized in accordance with the teachings of the present invention for storing the learned information relative to the operation of a typical reversing single stand roughing mill. In FIG. 4 the equation $$\frac{FM}{P}=a_0+a_1\left[\ln\frac{R}{H}\right]$$

where the natural logarithm of $R/H$ is a function of the roll radius $R$ divided by the entry height $H$ of the particular workpiece to the mill stand. It should be noted that the related quantity natural logarithm $D_m/H_m$ is in the process operation model equation stored within the storage memory of the digital computer 22 and used to calculate the average roll pressure as a preliminary step of roll force prediction for a given mill stand as required to make a desired reduction in the workpiece strip to be made by a passage of the workpiece strip through that stand; this model equation is set forth in the copending patent application Ser. No. 852,627 filed Aug. 25, 1969.

There is illustrated in FIG. 4 the typical informational data collected on three similar workpieces rolled through a mill stand with each workpiece requiring 7 passes. It should be noted that as the workpiece thickness becomes less and the quantity $R/H$ thereby becomes greater, the measured force $FM$ as compared to the predicted force P increases. This tendency to predict too high a force for the early passes and too low a force for the later passes can be stored in relation to the constants $a_0$ and $a_1$ of the linear polynomial equation and used whenever a similar workpiece product is rolled at some future time. This is accomplished by a least squares fit, which minimizes the square of the error between the predicted force correction value and the measured force correction value. Reference is here made to the related correlation theory set forth in a published book entitled Schaum's Outline Series published in 1961 by McGraw-Hill Book Company and entitled Theory and Problems of Statistics by Murray R. Spiegel. Beginning at chapter 14 of the latter book, page 241, there is illustrated a linear correlation such that measured data as plotted in FIG. 4 can be utilized to improve future rolling of similar grade and thickness classification workpieces to determine the constants in the linear mathematical relationship $Y=a_0+a_1[X]$ by a least squares regression; where $Y$ is the learned force correction factor as represented by a ratio of the measured force $FM$ over the predicted force $P$, and $X$ is the natural logarithm of $R$ over the entry height $H$ for the previous $(N-1)$ pass, where a determination of the constants for the equation are desired for the present pass $N$. From page 242 of the latter book, the equations for determining the constants $a_0$ and $a_1$ are as follows:

$$Y=a_0+a_1[X]$$

$$Y=FCF$$

$$X=\ln\frac{R}{H(N-1)}$$

$$a_0=\frac{[\Sigma Y][\Sigma X^2]-[\Sigma X][\Sigma XY]}{N\Sigma X^2-[\Sigma X]^2}$$

$$a_1=\frac{N\Sigma XY-[\Sigma X][\Sigma Y]}{N\Sigma X^2-[\Sigma X]^2}$$

The standard error equation is shown on page 243 of the latter book where N is the number of samples as follows:

$$S_{YX}^2=\frac{\Sigma Y^2-a_0\Sigma Y-a_1\Sigma XY}{N}$$

For the convenience of programming, the equations have been slightly modified to the following forms:

$$a_0=\frac{\frac{\Sigma Y}{N}\frac{\Sigma X^2}{N}-\frac{\Sigma X}{N}\frac{\Sigma XY}{N}}{\frac{\Sigma X^2}{N}-\frac{\Sigma X^2}{N}}$$

$$a_1=\frac{\frac{\Sigma XY}{N}-\frac{\Sigma X}{N}\frac{\Sigma Y}{N}}{\frac{\Sigma X^2}{N}-\frac{\Sigma X^2}{N}}$$

$$S_{YX}=\sqrt{\frac{\Sigma Y^2}{N}-a_0\left[\frac{\Sigma X}{N}\right]-a_1\left[\frac{\Sigma XY}{N}\right]}$$

Figure 5:
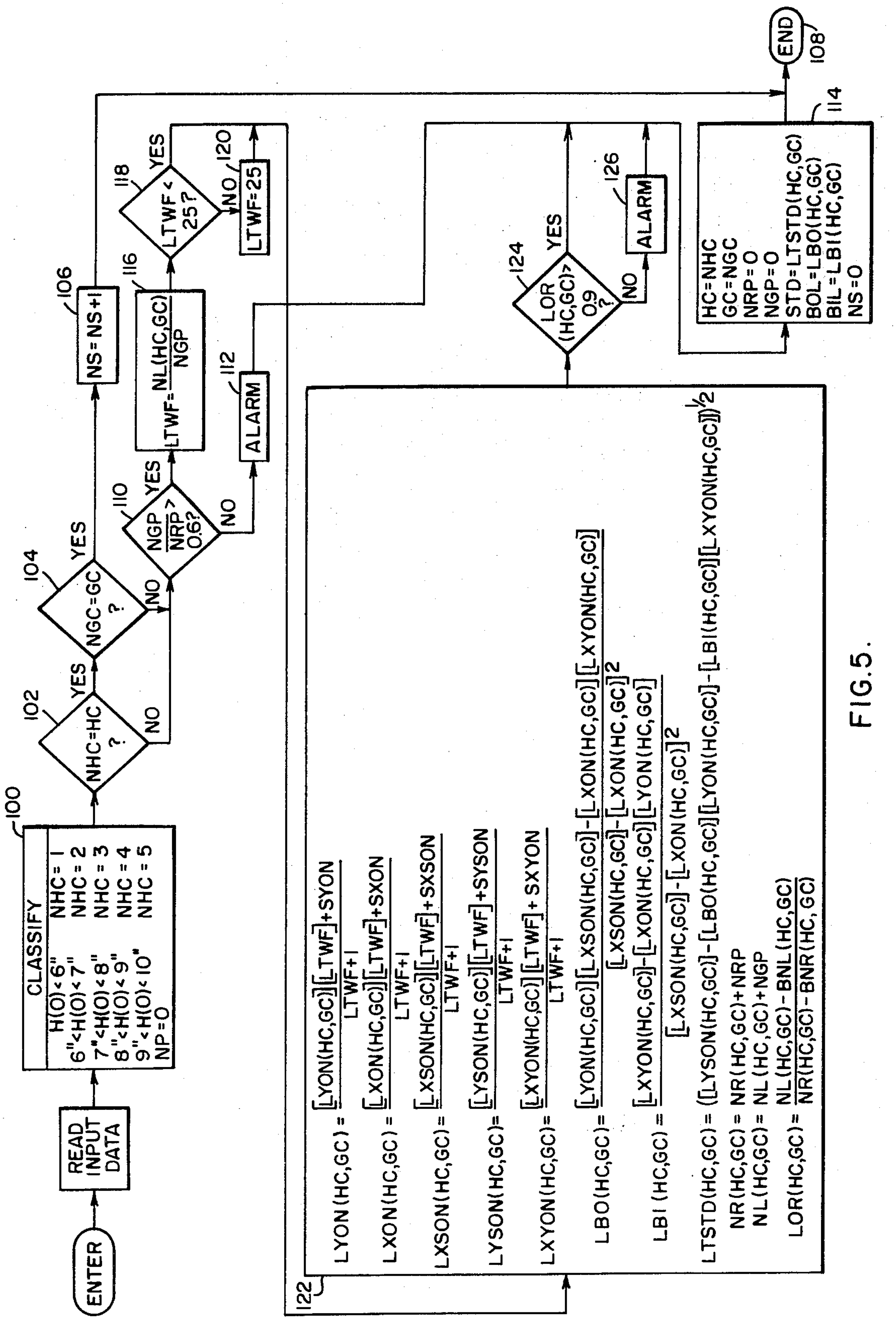
FIG. 5 illustrates the logic flow chart for the instruction program operative each time that information data for a new workpiece is supplied to the control computer, usually from a punched card. This program includes the classifying of the new workpiece, the updating of the learning equation expressions relative to the previous classification occurs, of workpiece just rolled when a change in workpiece classification occurs, and the choice of the appropriate learned values for the new workpiece product.
Figure 6:
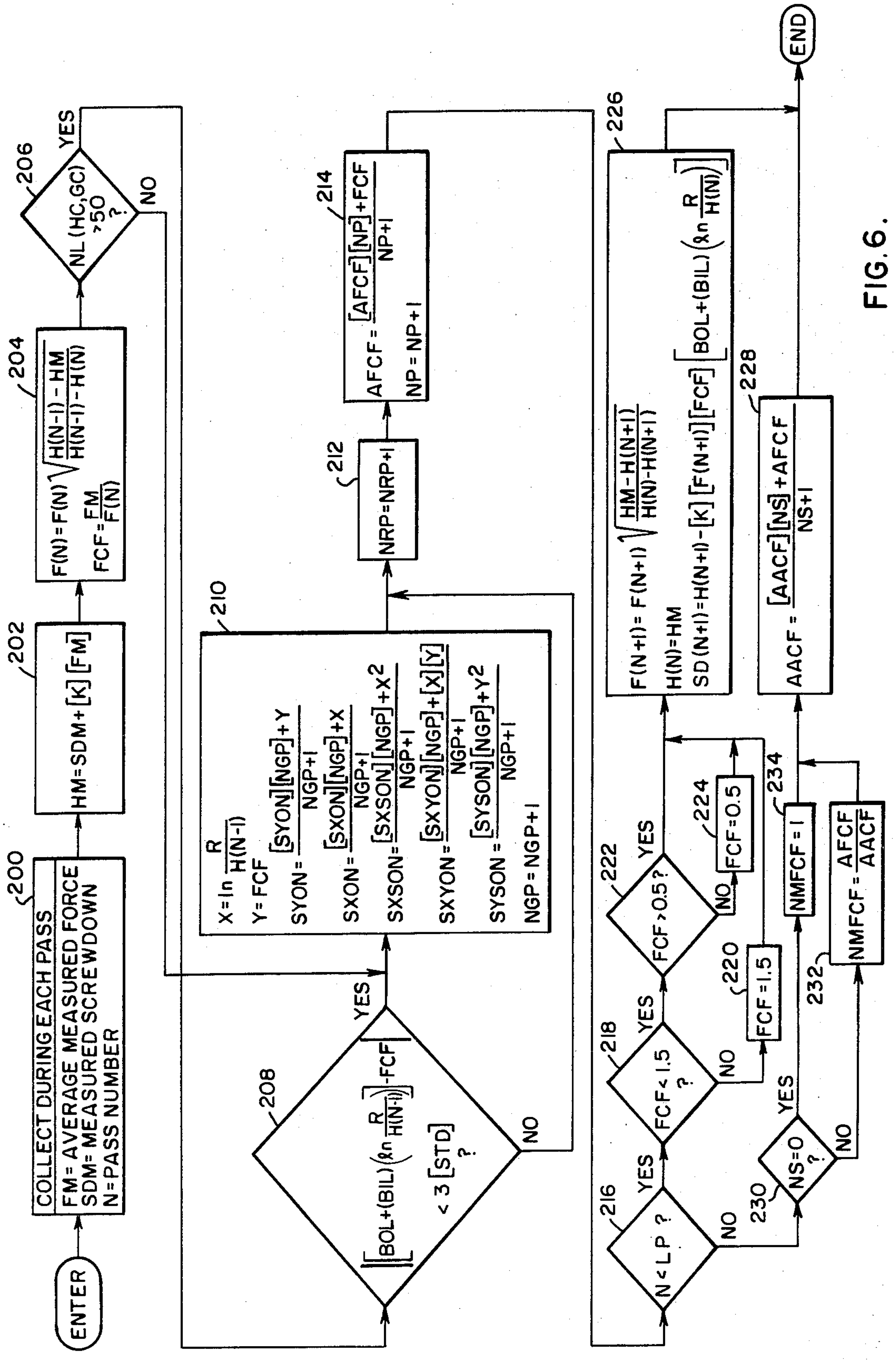
FIG. 6 shows the logic flow chart for a data collection and analysis instruction program operative each time a given workpiece passes through a mill stand. An evaluation of the data collected on each such pass is made, information is stored for use in updating the learning operation relative to this same classification of workpiece, and the roll force and screwdown values for the next pass are repredicted, using information obtained on the just completed workpiece pass and information gained from the learning procedure relative to previous passes of similar workpieces.

The average values of the necessary data is accumulated at step 210 in the flow chart shown in FIG. 6 as the workpiece rolling proceeds and these values are used at step 111 in the flow chart shown in FIG. 5 whenever the learning equation constants $a_0$ and $a_1$ are to be adjusted or updated. The instruction program illustrated in the flow charts of FIGS. 5 and 6 utilizes the following symbols to represent the variables shown in the proceeding three equations as follows:

LYON = learned $Y$ over $N = (\Sigma y)n$

LXON = learned $X$ over $N = (\Sigma x)/N$

LXSON = learned $X$ squared over $N = (\Sigma X^2)/N$

LYSON = learned $Y$ squared over $N = (\Sigma Y^2)/N$

LXYON = learned $[X]$ $[Y]$ over $N = (\Sigma XY)/N$

LB. = learned constant $a_0$

LB1 = learned constant $a_1$

LTSTD = learned standard error = $S_{XY}$.

The learning procedure of the present invention also determines the standard error STD which is a measure of how closely the first order linear polynomial mathematical relationship $$\frac{FM}{P} = a_0 + a_1 \left[ \ln \frac{R}{H} \right]$$

matches the measured data with a normal error distribution; the standard error STD will include about two-thirds of the measurements. About 98 percent of the measured data will be within three such deviations. The standard error is a useful piece of information in this program which limit checks each set of data to determine whether it is reasonable and useful for learning in regard to the constants of the provided control mathematical relationship. This is done at step 208 in FIG. 6. Since the normal scatter of the data is known for a particular thickness and grade classification of workpiece, a meaningful test should be made to determine whether any particular set of data is within the normal distribution of the error or whether it is probably not desired because of its size compared to the established standard error. This type of learning procedure is very useful to control the operation of a single stand reversing mill where the number of passes can vary considerably and where the conditions of rolling on successive passes is generally similar.

In regard to rolling horsepower predictions, the desired schedule calculations for the operation of a rolling mill require that torque and horsepower requirements for each pass be predictable as well as roll separating force. The former quantities are used to limit the draft or reduction to be taken in any workpiece pass through a given stand, and to divide the total required work among the various passes, and to limit the speed at which the rolling can proceed. A very similar method as here disclosed relative to stand roll force prediction and correction of same can be used to store information to improve the torque and horsepower predictions as made by the stored model equations relative to torque and horsepower.

The learning procedure of the present invention is effective to reduce the time required to get a given rolling mill process control digital computer system on-line and operative to produce a desired quality workpiece product. Changes in incoming product characteristics and delivery product requirements can be taken care of in a minimum of time and with minimum loss of undesired workpiece production. Changes in mill characteristics such as roll lubrication, type of rolls and other environmental variables can be made without extensive manual retuning of the control system; whenever such changes do occur, the weighting factor programs can be adjusted to respond rapidly to the new changes. Experience has shown that when used for on-line control of the process operation are a more important consideration than the utilized basic model equations and the off-line model equation building activity. A relatively simple model equation can be used to generate the original mill stand schedules and original mill stand setups, and through the adaptive learning procedure here described the simple model equation is made to work rather well with a minimum of complexity and off-line adjustment being required.

In FIG. 5 there is shown in detail an operational logic flow chart of the instruction program for the digital computer 22 of FIG. 1 that is initiated each time that data for a new workpiece to be rolled is read into the computer, which data is usually obtained by reading a punched card. Step 100 classifies the new product in accordance with entry thickness or height $H(O)$; for example, if the entry height of the workpiece about to enter the mill stand is less than 6 inches, the new height class NHC is set equal to one; for workpiece entry heights between 6 inches and 7 inches, the new height class NHC is set equal to two; for an entry height greater than 7 inches and less than 8 inches, the new height class NHC is set equal to three; for an entry height greater than 8 inches and less than 9 inches, the new height class NHC is set equal to four; for a workpiece entry height greater than 9 and less than 10, the new height class NHC is set equal to five. Thusly, this step 100 in the instruction program classifies each new workpiece product into one of five categories of height classes. In addition, the number of passes NP is set equal to zero in step 100. At step 102, a check is made to see whether the new heighth class for the piece to be rolled is the same as the heighth class for the last workpiece rolled. At step 104, a check is made to see if the new grade class which is supplied as input information is different from the grade class of the workpiece previously rolled. If the new height class NHC is the same as the previous height class HC and new grade class NGC is the same as the previous grade class GC, the program is advanced to step 106 where the number of slabs NS is increased by one and the instruction program terminates at step 108. If the new workpiece product is different from the previous rolled workpiece product, in regard to either height class NHC or grade class NGC, the instruction program updates the constants $a_0$ and $a_1$ to be stored away in the storage memory 21 of the digital computer 22 for the classification of future workpiece products similar to the workpiece the rolling of which was just completed. In this regard, at program step 110 a check is made to see if the number of good passes NGP in the last group of similar workpieces is greater than an arbitrarily chosen proportion of 60 percent of the total number of similar workpiece roll passes NRP. If the number of good passes NGP is less than 60 percent a suitable alarm is sounded at step 112 to show that the proportion of good data is too small and the instruction program advances to step 114. On the other hand, if the number of good passes NGP is acceptable, the program advances to step 116 where a learning table weighting factor LTWF is determined in accordance with a predetermined division of the total number os passes NL (HC, GC) used for learning already stored in the storage memory table relative to this workpiece classification (HC, GC) divided by the number of good passes NGP just collected before a change in the similar workpiece product occurred. The learning table weighting factor LTWF is limited to 25 at step 118 and step 120, and the program advances to step 122 where there is an accumulation and determination of the various parameters required in the least squares regression relative to up dating of the learning equation constants $a_0$ and $a_1$ using the learning table weighting factor LTWF. This is in accordance with the weighting formula $$\mathrm{MEAN} = \frac{[\mathrm{MEAN}]\ [WF] + \mathrm{NEW}}{WF+1}$$

previously explained. In step 122, the learning equation constants LBO, which is the same as $a_0$ , and LB1, which is the same as $a_1$, are calculated along with the standard deviation LTSTD. The number of learned passes NL(HC, GC) for this particular workpiece classification is increased by the number of good passes NGP. The number of roll passes NR (HC, GC) is increased by the number of passes rolled for this classification of work product just completed. The calculation is also made to find LOR (HC, GC) the ratio of the number of passes used in the learning process to the number of roll passes; this can be done for a particular period by setting BNL equal to NL and BNR equal to NR at the beginning of that period and the comparison will then represent the number of passes used in the learning divided by the total number of roll passes during that chosen period of time. A check is made at step 124 to detect values of this ratio LOR (HC, GC) which are less than 0.9 indicating that less than 90 percent of the data collected is good data. If the check at step 124 indicates that less than 90 percent of the data collected was good data, step 126 provides a suitable alarm of this condition. The program advances to step 114 where the height class HC is changed to the new height class NHC, and the grade class GC is changed to the new grade class NGC. The number of roll passes NRP and the number of good passes NGP are set equal to zero, since an change in work product is about to begin rolling. The standard error and the equation constants LBO and LB1 for the new product as resulting from previous rolling of similar classification workpieces are removed from the storage memory learning table and respectively indicated as BL0 and Bl1 for use in the FIG. 6 flow chart, and the number of workpiece slabs NS is set equal to zero. This terminates the operation of the instruction program shown in FIG. 5.

In FIG. 6 there is shown the logic flow chart for a data collection and analysis instruction program operative with the process control digital computer 22. This program is initiated during the rolling of each workpiece pass in a given mill stand. An evaluation of the information data collected on each pass is made, the information is then stored for use in updating the constants $a_0$ and $a_1$ of the learning procedure, and the force and screwdown values are repredicted for the next pass of a similar workpiece using the information gained on all previous passes of similar workpieces as well as the immediately previous pass of a similar workpiece. Step 200 collects the pass average roll force FM as measured, and measures the unloaded screwdown position SDM. The present pass is identified as pass N of a workpiece having a height class HC and a grade class GC. Step 202 uses these values along with the predetermined mill stand stretch factor $K$ (where $K$ is 1/M) to establish the workpiece roll force delivery height HM from the present pass $N$, in accordance with the well known relationship $HM = SD + [K]\ [FM]$. The predicted force $F(N)$ for pass $N$ is determined from the operational model equation stored in the memory of the process control digital computer 22, with an example of one suitable model equation being disclosed in copending patent application Ser. No. 852,627 filed Aug. 15, 1969. The predicted force $F(N)$ is adjusted to represent the actual draft taken by multiplying the model equation predicted force $F(N)$ for pass $N$ by the square root of the ratio of the actual draft, which is the thickness delivered from the given stand on the previous pass ($N$—1) minus the delivery thickness $HM$ from the present pass, divided by the planned draft, which is the delivery thickness from the given stand on a previous pass ($n$—1) minus the predicted or desired delivery thickness $H(N)$ from the present pass $N$. A force correction factor $FCF$ is calculated by dividing the measured stand roll force $FM$ by the repredicted roll force $F(N)$.

After enough operational data has been collected to determine a meaningful standard error deviation STD for the workpiece product being rolled, a determination is made to see if the data just collected is within a normal error pattern. A check is made at program step 206 to determine if more than 50 passes of data have been previously used in the learning procedure. A check is made at step 208 to determine whether the absolute value of the difference between the determined force correction factor FCF for the present workpiece and the learned equation value $$BOL + [B1L]\left[\ln \frac{R}{H(N-1)}\right]$$

for previous workpieces is less than three times the established standard error deviation STD. If it is within this permissible range, the new data is used to accumulate the necessary parameters for the learning procedure previously described above and as set forth at program step 210. The sum of $Y$ over $N$ is the quantity SYON and it is determined in relation to he number of good passes NGP for the present workpiece to include only good data in the learning procedure. Similarly the sum of $X$ over $N$ which is SXON, the sum of $X$ squared over $N$ which is SXSON, the sum of $XY$ over $N$ which is SXYON and the sum of $Y$ squared over $N$ which is SYSON are determined in relation to the number of good passes. These parameters are used in the flow chart of FIG. 5 at step 122 whenever a change in workpiece classification occurs and for the purpose of updating the mathematical relationship constants LB0 and LB1 for the work product the rolling of which was just completed. The number of good passes NGP is increased by 1. If the check made at program step 208 shows that the new data is out of limits and therefore not good to use for the accumulation of data parameters for the learning procedure of the present invention, the program advances directly to step 212. On the other hand if the check made at program step 208 shows that the new data is within the desired limits and therefore good data, after the accumulation of data parameters function performed at program step 210, the program advances to step 212. At program step 212 the number of rolled passes NRP is increased by 1. At program step 214 an average force correction factor AFCF for the piece now being rolled is calculated, and the number of passes NP performed on the workpiece being rolled is increased by 1. As long as the present pass N is less than and therefore not the last pass LP as determined at program step 216, the instruction program advances to steps 218 through step 224 where the force correction factor FCF is limited to values between 0.5 and 1.5 for use in repredicting the stand roll force for the next pass $(N+1)$ on the present workpiece. At program step 226 an adjustment is made in the predicted force $F(N+1)$ for the next pass for the present workpiece piece to compensate for slight changes in the workpiece draft or reduction taken, and the workpiece height delivered from the present pass $N$ is set equal to the measured height as determined at program step 202. In addition a new screwdown setting SD $(N+1)$ for the next pass of this workpiece is determined in accordance with the desired delivery height $H$ $(N+1)$ to be delivered from the next pass $(N+1)$, minus the product of the known mill spring factor K and the predicted roll force F $(n+1)$ as corrected by the force correction factor FCF determined from the present pass (N) and additionally as influenced by the learning equation established correction $$BOL+B1L\left[\ln \frac{R}{H(N)}\right]$$

developed from past rolling of previous similar workpiece products.

For the situation where the present pass N is the last pass LP as determined at program step 216, the program advances to step 230 where a check is made to see if the number of workpiece slabs NS that have been rolled of this particular grade and thickness classification is zero to indicate a change of workpiece classification has occurred. If the answer at step 230 is no, the program advances to step 232 where a next mill force correction factor NMFCF is determined by dividing the average force correction factor AFCF for this workpiece by the accumulated average force correction factor AACF for the rolling of all passes on previous similar workpieces of this same grade and thickness classification. The latter determination would be particularly useful for recalculating the screwdown settings on any kind of rolling mill which workpiece pass $N$ is taking place by a procedure very similar to that shown in the last part of program step 226 where the screwdown setting is determined but in this case the next mill force correction factor NMFCF would be used instead of the force correction factor FCF.

If the check made at program step 230 finds that the number of slabs NS is equal to zero, the piece just rolled is the first of a sequence of products of this particular grade and thickness classification, so the program advances to step 234 where the next mill force correction factor is arbitrarily set equal to one since no meaningful comparison can be made with the products just previously rolled. At step 228 the accumulated average correction factor AACF for all consecutive like workpieces is determined as the previous accumulated average correction factor times the number of consecutive like workpieces plus the established average correction factor divided by the number of slab workpieces plus one. This is the functional end of the instruction program set forth in FIG. 6.

In FIG. 7 there is provided an illustrative showing of workpiece classification by height class versus grade class of learning determined parameters to illustrate that for the mathematical relationship $$\frac{FM}{P}=a_0+a_1\left[\ln \frac{R}{H}\right]$$

set forth relative to FIG. 4, the learning procedure develops an updated determination of the constants $a_0$ and $a_1$ for determining the force correction factor FM/P to be utilized to predict the roll separation force for a next pass of a particular grade and height classification workpiece. The information stored in FIG. 7 would apply to one stand or several stands having similar rolls, strip lubrication, and so forth.

In FIG. 7 there is provided an illustration of typical learned values for the parameters $a_0$, $a_1$ and STD for height and grade classifications. From the illustration of FIG. 7 it should be noted that for grade class 1, no accumulated learning has taken place relative to workpiece height classes 3 and 4. However, accumulated learning has taken place to indicate past rolling experience, upon which this learning is determined, for height classes 1, 2 and 5. The illustration of FIG. 7 shows that no previous rolling has been experienced in grade classes 2, 3, 4 or 5. The operation of the control system is such that should additional similar workpieces or even a change in workpiece classification occur, adaptive control of the rolling operation would take place. For example, assume the mill for which the FIG. 7 data would apply was previously utilized for rolling of workpieces of grade class 1 and height class 5 is now changing to roll workpieces of grade class 1 and height class 2. The digital computer 22 would utilize the parameter values $a_0 = 0.25$, $a_1 = 0.15$ and STD = 0.03 from storage memory learning table shown in FIG. 7 in controlling the rolling of the new workpiece classification of grade class 1 and height class 2. The screwdown settings for the new workpiece will be determined by adjusting the predicted forces determined in accordance with the mathematical relationship $$a_0+a_1\left[\ln \frac{R}{H}\right]$$

set forth relative to the showing of FIG. 4 and as detailed at step 226 of FIG. 6.

Over a period of time should a plurality of similar workpieces be rolled in succession in a given grade and height class, an accumulated average correction factor, AACF would be determined using data from all the passes rolled on the succession of similar workpieces. If the next pieces rolled is of the same classification as the preceeding group, the average correction factor AFCF for the passes performed on the piece being processed can be used to compare the hardness of the piece being rolled with the hardness of the group of similar pieces which preceeded the current rolling and this comparison can be used to improve the setting of the next rolling process. For example, if the group of pieces were, on the average, 10 percent harder than the model, AACF would be equal to 1.1 and if the piece just rolled was slightly softer than the model equation prediction with an AFCF value of 0.99, the correction to be used on the next workpiece rolling process, NMCF, would be 0.99/1.1 or 0.9 indicating it is 10 percent softer than the workpieces of the preceeding group. If the next stand or group of stands is using an adaptive procedure similar to that described for this stand, the mill setup will reflect the values measured on the succession of similar workpieces and the next rolling process correction factor, NMCF, determines the correction for the current workpiece when it is rolled in the next rolling process.

Figure 8:
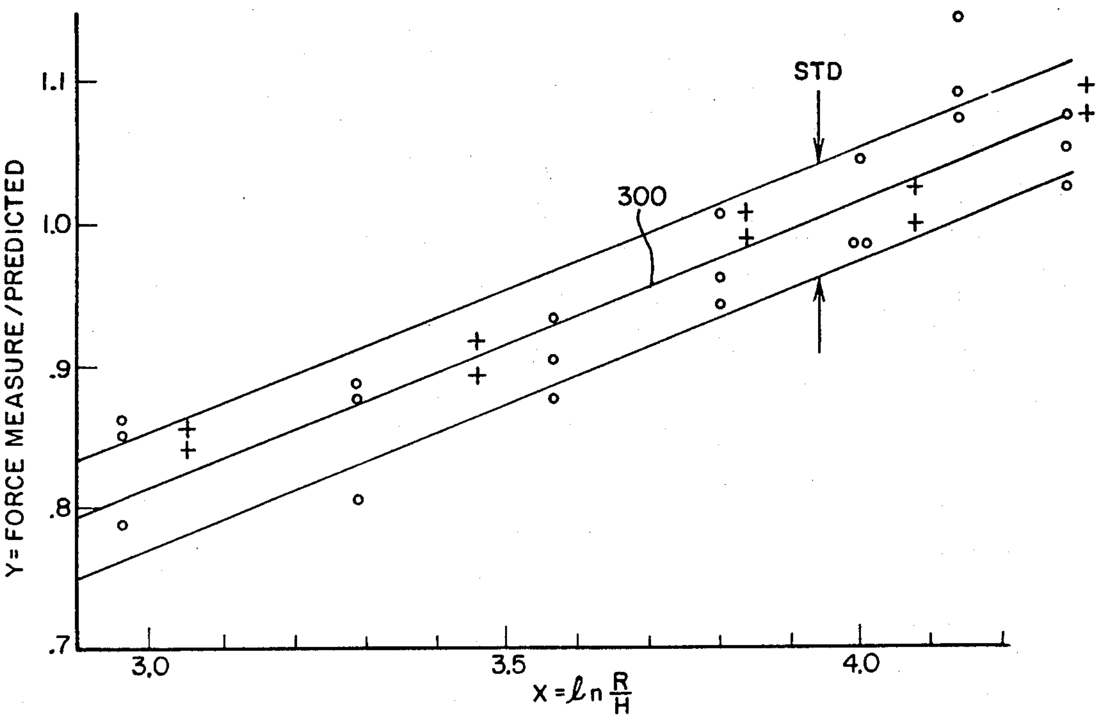
FIG. 8 illustrates the provided data correlation relative to a plurality of workpiece passes through a given rolling mill stand.

In FIG. 8 there is provided a plot, generally corresponding to the data plot of FIG. 4, illustrating the applicability of the teachings of the present invention to a situation where a varying number of passes of a work product through a given rolling mill is taken. The solid line 300 represents a plot of the mathematical relationship $FCF = a_0 + a_1 [X]$, where $X$ is the natural logarithm of the work roll radius $R$ divided by the input workpiece height $H$ to the mill stand. It will be seen that the data for three workpieces reduced in seven passes each, as compared to the two workpieces reduced in five passes each all would appear to fit a general pattern which could be correlated in some mathematical relationship such as the above formula relationship for FCF in accordance with the teachings of the present invention.

Many operating conditions change during the performance of a metal rolling mill stand which are very difficult to identify in advance, such that the teachings of the present invention will provide a long term follow learning technique in regard to whatever happens to a given rolling mill stand. There is here provided a practical adaption technique to adjust the available model equations by learning from any actual rolling experience with similar workpieces and classifying this learned information such that it can later be recalled when desired for the rolling of other similar workpieces. The technique of the present invention enables a more rapid startup in getting on-line of the given rolling mill relative to any particular work product previously rolled to produce a more commercially acceptable product. The learning technique in this way takes much of the inertia out of the control system and more rapidly converges onto very accurate and very desirable rolling practices.

It should be further understood that it is within the scope of the present invention relative to the operation of rolling mill stands such as a reversing single mill stand or stands of a tandom rolling mill for the storing of the previously learned operation correction information to be in relation to some other variable than the variable illustrated in FIG. 4. It may instead by desirable to store the learned information in accordance with a per unit draft variable rather than the function $R/H$ or some other mill operation variable. This latter choice can be correlated with the available process operation model equations as well known to persons skilled in this art. The classification of the products rolled might envolve other characteristics in addition or instead of grade and height such as product width.

What is claimed is:

1. The method of controlling a rolling mill operation relative to at least one present workpiece and performed by a digital computer having a program stored in memory which enables the computer to perform the steps of establishing a predicted operation for said rolling mill in accordance with a predetermined process operation relationship for said rolling mill, establishing a correction factor for the operation of said rolling mill using information learned from the operation of said rolling mill with at least one previous workpiece similar in height and grade to said present workpiece, which correction factor is established by a predetermined correlation relationship including at least one learned parameter within said correlation relationship, establishing a repredicted operation for said rolling mill in accordance with said predicted operation and said correlation factor, and passing said present workpiece through said mill stand in accordance with said repredicted operation of said rolling mill.

2. The method of claim 1, with said predetermined correlation relationship being a mathematical equation of the form $a_0 + a_1 [X]$, where $a_0$ and $a_1$ are learned parameters and $X$ relates to the operation of said rolling mill to effect a desired reduction in the thickness of said present workpiece.

3. The method of claim 1, with a different correction factor being established for each predetermined classification relative to at least one of a height characteristic and a grade characteristic of the workpieces passed through said rolling mill.

4. The method of claim 1, with said correction factor being established by a predetermined weighting consideration of information learned from the operation of said rolling mill with at least said one previous workpiece and information learned from the operation of said rolling mill with said present workpiece, with said previous workpiece being similar to said present workpiece in regard to a predetermined classification of said workpieces.

5. The method of claim 1, with a different correction factor being established in relation to each of similar predetermined classifications of the workpieces passed through said rolling mill and in relation to a learning procedure weighting factor in regard to the number of previous good passes of similar classification workpieces through said rolling mill.

6. In apparatus including a digital computer having a program stored in memory for controlling the thickness of a present workpiece having a predetermined classification and passed through a rolling mill stand after at least one previous workpiece having a similar classification has already passed through said rolling mill stand, the combination of means for providing a predicted operation of said mill stand in accordance with a predetermined process operation relationship for said mill stand and the classification of said present workpiece, said means additionally providing an operational correction factor for said mill stand in accordance with a predetermined correlation of information learned from passing through said mill stand at least one previous workpiece having a similar classification, said correlation of information including at least one learned parameter that is classified in accordance with at least one of the grade and the height classification of said present workpiece, and said means further providing a repredicted operation of said mill stand in relation to said predicted operation and said operational correction factor, and means for determining the passage of said present workpiece through said mill stand in accordance with said repredicted operation of said mill stand.

7. The apparatus of claim 6, with said predetermined correlation including information learned from at least one pass through said mill stand of said present workpiece.

8. The apparatus of claim 6, with said operational correction factor being updated after the completed operation of said rolling mill with said present workpiece, said updating being in relation to a predetermined weighting factor times the information learned from passing through said mill stand at least one previous and similar workpiece in addition to the information learned from passing said present workpiece through said mill stand.

9. In a control system including a digital computer having a program stored in memory and being operative with a rolling mill stand for reducing the thickness of at least a present workpiece of a plurality of workpieces, the combination of means for predicting the operation of said mill stand to provide a desired reduction in said present workpiece by said mill stand in accordance with a first predetermined functional relationship for said mill stand and the predetermined classification of said present workpiece, said means additionally determining respective corrections for the operation of said mill stand corresponding to predetermined classifications of said workpieces, with each said correction being a predetermined correlation relative to a plurality of reductions made by said mill stand on previous workpieces having a similar classification and with this determination including a comparison between a previous predicted operation of said mill stand for at least one workpiece having said predetermined classification and the corresponding actual operation of said mill stand for at least the latter said workpiece, said means further determining if the classification of said present workpiece is different than the classification of the last workpiece reduced by said mill stand, and said means updating said correction corresponding to the classification of said last workpiece when said present workpiece is different than said last workpiece, and means for determining the passage of said present workpiece through said mill stand in accordance with said predicted operation of said mill stand and said correction corresponding to the classification of said present workpiece.

10. The control system of claim 9, with the correction corresponding to the classification of said present workpiece being updated by a predetermined combination of said correction determined prior to said present workpiece being reduced in thickness by said mill stand and said correction determined after said present workpiece is reduced in thickness by said mill stand.

11. The method of controlling the operation of a rolling mill with a present workpiece and performed by a digital computer having a program stored in memory which enables the computer to perform the steps of establishing an accumulated average first correction factor in accordance with operational data collected for the rolling of at least one previous workpiece, establishing an average second correction factor in accordance with operational data collected for the previous rolling of said present workpiece, and establishing a next operation correction factor for said rolling mill with said present workpiece in accordance with said first correction factor and said second correction factor for determining the operation of said rolling mill relative to said present workpiece.

12. The method of claim 11, with said first correction factor being established in relation to the rolling of at least one previous workpiece which is similar to said present workpiece.

13. The method of claim 11, with said first correction factor and said second correction factor being established in relation to the making of similar reductions in the thickness of similar workpieces.

14. The method of controlling the operation of a rolling mill relative to a present workpiece by a digital computer having a program stored in memory to perform the steps of establishing a predicted value for at least one parameter determining the operation of said rolling mill with said present workpiece and in accordance with a predetermined understanding about said rolling mill operation, establishing a first deviation for the operation of said rolling mill with at least one similar and previous workpiece and relative to the actual value of at least said one parameter relative to a predicted value of at least said one parameter, establishing a second deviation for the operation of said rolling mill with said present workpiece relative to the actual value of at least said one parameter, comparing said first deviation with said second deviation to determine the operation of said rolling mill.

15. The method of claim 14, with said one parameter predicted value being the roll force for a given stand of said rolling mill and being established in accordance with said predetermined understanding about said rolling mill operation, and with said first deviation being established in relation to the actual value of said roll force when said previous workpiece was passed through said rolling mill stand and the predicted value of said roll force prior to said previous workpiece being passed through said rolling mill stand.

* * * * *